June 28, 1949.   J. DRZEWIECKI   2,474,519
LOCK FOR AUTOMOBILE DOORS
Filed June 1, 1946   2 Sheets-Sheet 1
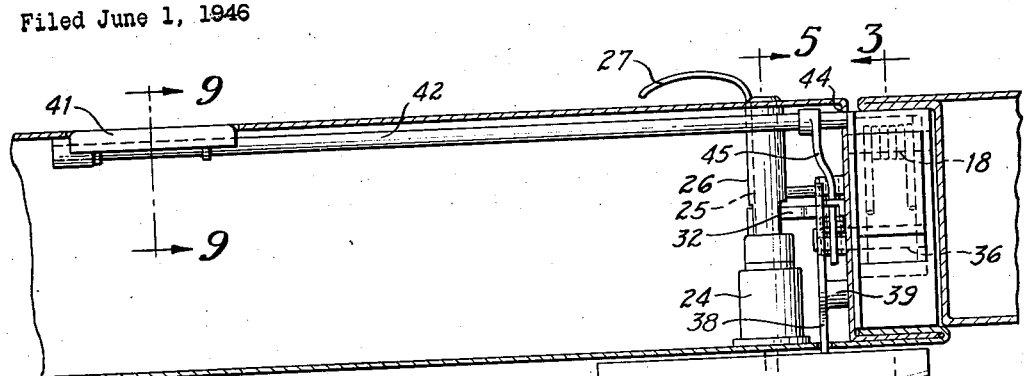
FIG. 1.
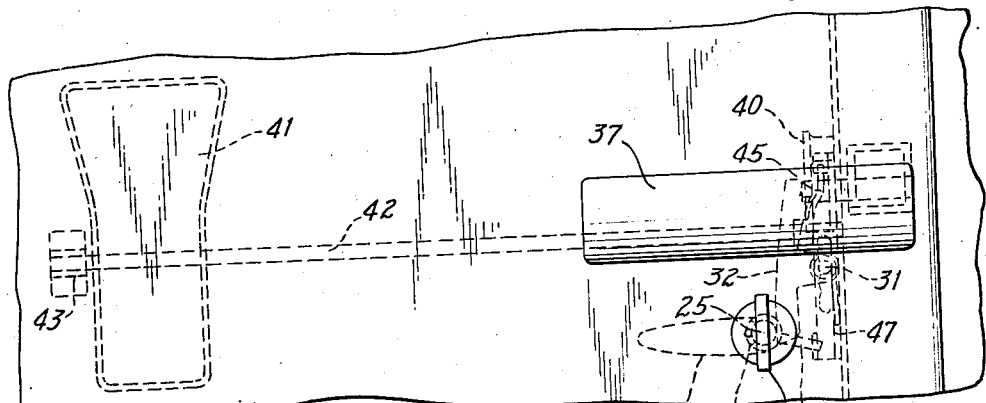
FIG. 2.
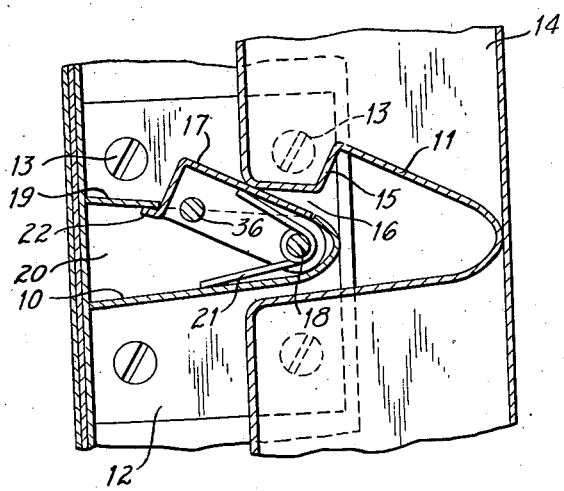
FIG. 3.
FIG. 4.
INVENTOR.
Joseph Drzewiecki
BY Louis Chayka
ATTORNEY June 28, 1949. J. DRZEWIECKI 2,474,519
LOCK FOR AUTOMOBILE DOORS
Filed June 1, 1946 2 Sheets-Sheet 2
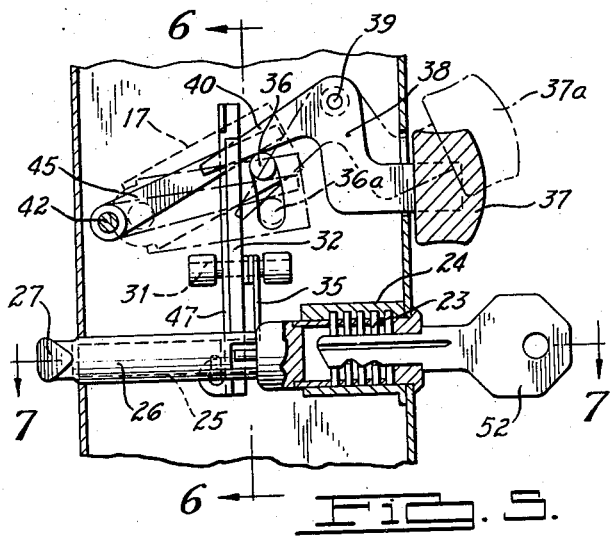
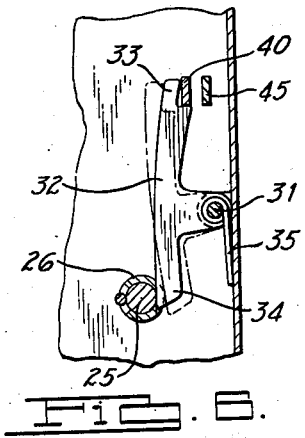
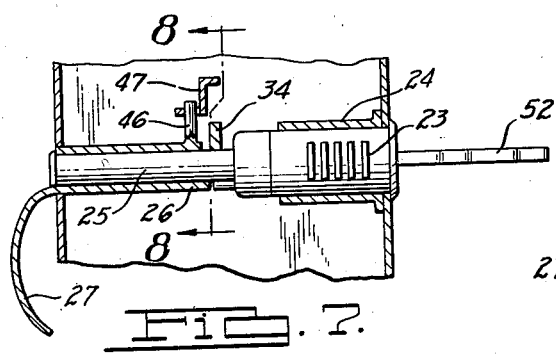
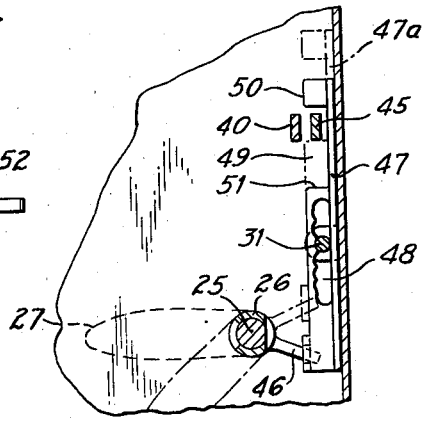
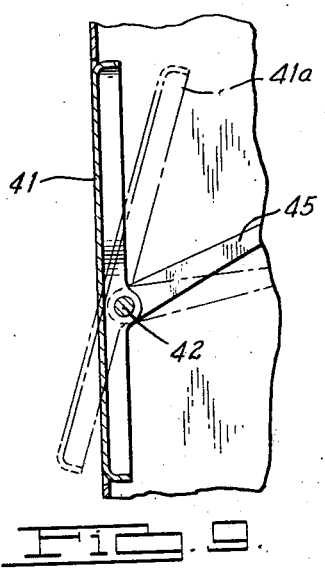
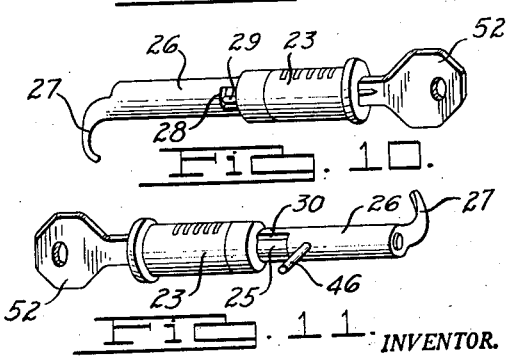
INVENTOR.
Joseph Drzewiecki
BY Louis Chayka
ATTORNEY Patented June 28, 1949

2,474,519

UNITED STATES PATENT OFFICE 2,474,519

LOCK FOR AUTOMOBILE DOORS

Joseph Drzewiecki, Algonac, Mich.

Application June 1, 1946, Serial No. 673,832

2 Claims. (Cl. 70—142)

The purpose of my invention is to provide a lock for automobile doors, the lock being characterized by its simplicity and absence of prominent projections on the surface of the door outside or inside. The latter fact will be recognized as a desirable safety factor.

My object is to provide a lock which may be easily installed or easily repaired without the need of removing any covering, walls, or surfaces of the door.

I shall now describe my lock with reference to the accompanying drawings, in which:

Fig. 1 is a plan sectional view of the free end of a hinged automobile door with my lock therein, said view including also an adjacent pillar of the automobile body;

Fig. 2 is a side elevation of the same part of the door and the same part of the automobile body which is shown in Fig. 1;

Fig. 3 is a sectional view on line 3—3 of Fig. 1, disclosing a latch of my lock in its locked position;

Fig. 4 is a sectional view of the latch in its disengaged position;

Fig. 5 is a sectional view on line 5—5 of Fig. 1;

Fig. 6 is a sectional view on line 6—6 of Fig. 5;

Fig. 7 is a sectional view on line 7—7 of Fig. 5;

Fig. 8 is a sectional view on line 8—8 of Fig. 7;

Fig. 9 is a sectional view on line 9—9 of Fig. 1;

Fig. 10 is a perspective view of a tumbler drum and a sleeve, being a part of my lock;

Fig. 11 is a reversed perspective view of the elements shown in Fig. 10.

Similar numerals refer to similar parts throughout the several views.

The two basic elements of my lock are a latch 10 and a keeper or socket 11. The latch is made of sheet metal, in the shape of a hollow wedge projecting laterally from a mounting plate 12, retained in place by screws 13 on a door jamb of an automobile. The socket disposed in pillar 14, which is a stationary part of the automobile body, is shaped correspondingly to accommodate said latch and includes an inner shoulder 15 disposed sharply upwardly from passage 16, into which the latch is adapted to enter. The latch itself includes a movable member 17 pivoted by means of a cross-pin 18 within the tip portion of its body, said member projecting normally above the upper surface 19 of the shank portion 20 of the latch. A wire spring 21 coiled around pin 18 acts from inside against member 17, urging it outwardly to the extent allowed by a lug 22 projecting therefrom, as shown in the drawing. When the latch enters passage 16 of socket 11, member 17 is depressed against the tension of spring 21, but once the latch has fully entered said socket, said movable member rises to its normal position to abut from inside against shoulder 15, as shown in Fig. 3. This is the interlocked position of the two basic units of my lock, that is, the latch and the socket.

I shall now describe the means designed to disengage the latch. These include a tumbler mechanism of the conventional type, including a tumber drum 23 disposed within a cylinder 24. This is affixed to the door of the automobile cross-wise, according to the accepted practice. Extending axially from the drum is a stem 25. Fitting over said stem is a sleeve 26 terminating on the inside wall of the automobile door with a handle 27. At its inner end where the sleeve abuts the end of drum 23, it contains a broad notch 28. A short pin 29, set eccentrically in the end of the drum, projects therefrom into said notch so that a rotation of the drum will result in the rotation of the sleeve, and vice versa. On its other side, diametrically opposite to the notch, the sleeve is flattened by being ground off in a plane at right angle to its radius, as shown at 30 in Fig. 11.

Pivotally mounted above the axis of sleeve 26 on a shaft 31, disposed parallel thereto as shown in Fig. 6, is a dog 32 having an indented rest 33 at its upper end, while the lower end 34 abuts tangentially sleeve 26, normally bearing against the ground off surface 30 thereof.

The latch described above is equipped with a short bolt 36, projecting laterally therefrom inwardly into the body of the door beyond the mounting plate 12 on the jamb of the door, said bolt being adapted to be engaged by other elements of my lock. One of these elements may be operated by handle 37. The handle, which differs from handles ordinarily used for automobiles, being made in the form of a horizontal bar, is mounted on a lever 38 fulcrumed at 39 and including an arm 40. The arm is adapted to engage said bolt 36 so that by means of the handle, that is, by swinging the handle upwardly to position 37a, the bolt will be depressed, resulting in the depression of the interlocking member 17 of the latch, allowing the latch to be withdrawn from socket 11. It will be seen, however, that the end of arm 40 projects far enough to extend over the indented rest 33 on dog 32. When said rest is right below arm 40, it cannot be depressed and the door remains locked.

This is where the function of the sleeve 26 comes in. Normally, its flat surface 30 is in contact with the lower end 34 of dog 32. Arm 40 fits over the rest 33 and the latch remains in its interlocked position, as shown in Fig. 3. When, however, the sleeve is turned around its axis by means of tumbler drum 24, which is operated by a key 22, so that the round surface of the sleeve bears against said dog. The cam effect of the turn causes the upper part of the dog to slide from under the arm 40 allowing bolt 36 to be depressed by means of handle 37.

From inside handle 27, being a part of the sleeve, serves the same purpose of imparting a rotary motion to the sleeve as above described, with respect to the function of handle 37 and parts actuated thereby.

In addition to the above structure, I have provided additional controls of my latch, making it possible to operate my lock from inside the automobile. One of these controls actuated by handle 27 has already been described. The other control includes a vertically disposed plate 41, disposed flush with the inside surface of the door. The plate is affixed to a shaft 42, which at one end is journalled in a bearing 43, while the opposite end is journalled in the jamb of the door at 44. A finger 45 projects radially from the shaft, extending over bolt 36. When the upper part of plate 41, above the level of shaft 42, is pushed inwardly, said finger 45 will depress bolt 36 in latch 10 allowing the door to be opened.

Said plate 41 may also be used as a means of locking the latch against withdrawal from socket 11. This is accomplished as follows: Sleeve 26 is provided with a radial spoke 46, which is disposed on the flat side 30 of said sleeve. The spoke is loosely connected with an upright sliding bar 47, having a slot 48 for transverse passage of shaft 31, supporting dog 32. In its upper portion the bar has a recess 49, the limits of the recess at the top and bottom being defined by horizontal shoulders 50 and 51 respectively. The finger 45 traverses said recess and is adapted to be engaged by said shoulders alternately.

Assuming that the lock is open, the dog 32 being in a position shown in Fig. 6, and that it is desired to lock the door, this may be done by pushing inwardly the lower portion of plate 41. This will cause finger 45 to shift upwardly, which will lift bar 47 to a position 47a shown in dotted lines. As the lower part of the bar is connected to sleeve 26, this will cause the sleeve to turn around its axis so that its flat side is in contact with dog 32. This, as already explained, will prevent depression of bolt 36 leaving latch 10 in its locked position within socket 11.

It will be obvious that some changes may be made in the structure of my lock and the combination of its parts without deviating from the inventive principle disclosed herein, what I therefore wish to claim is as follows:

1. A lock for automobiles as described comprising a socket in the body of the automobile, and elements in the door including a latch adapted to enter the socket and having a depressible member for interlocking with parts within the socket, a lateral bolt on said depressible member, a handle on the outer side of the door, a pivoted arm extending therefrom and adapted to depress the bolt, a spring-actuated dog comprising a vertically disposed, elongated member, pivoted midway its length and having at its upper end a shoulder normally projecting under the arm extending from the handle to prevent the arm from being depressed, a key-operated cam bearing against the lower end of the dog to impart to it a partly rotary motion upon its pivot to withdraw the upper part of said dog from under the arm extending from the handle, to permit depression by means of said arm of the bolt on said depressible member of the latch within the socket to disengage the latch therefrom.

2. A lock for a door of an automobile including a socket in its body adjoining the jamb of the door, and elements in the door, including a latch having a pivoted depressible member for interlocking with recessed parts in the socket, a lateral bolt on said depressible member, a handle on the outer side of the door, the handle being mounted on a pivoted arm extending transversely over the bolt for engagement therewith, a pivoted dog normally in the way of the arm to prevent it from being pressed downwardly upon the bolt, a rotary key-operated tumbler mechanism in the door, and a cam sleeve axially extending therefrom and adapted to be rotated by said tumbler mechanism, said sleeve bearing against the dog to move it out of the way of the handle-operated arm.

JOSEPH DRZEWIECKI.

REFERENCES CITED

The following references are of record in the file of this patent:

UNITED STATES PATENTS

| Number | Name | Date |
|---|---|---|
| 2,143,965 | Van Voorhees | Jan. 17, 1939 |
| 2,286,992 | Murphy | June 16, 1942 |
| 2,329,232 | Van Voorhees | Sept. 14, 1943 |